(12) United States Patent
Brooks

(10) Patent No.: US 8,665,175 B2
(45) Date of Patent: Mar. 4, 2014

(54) THERMAL CONTROL FILM FOR SPACECRAFT

(75) Inventor: Paul Joseph Brooks, Stevenage (GB)

(73) Assignee: Astrium Limited, Hertfordshire (GB)

( * ) Notice: Subject to any disclaimer, the term of this patent is extended or adjusted under 35 U.S.C. 154(b) by 1538 days.

(21) Appl. No.: 10/584,407

(22) PCT Filed: May 17, 2006

(86) PCT No.: PCT/GB2006/050114
§ 371 (c)(1),
(2), (4) Date: Jun. 26, 2006

(87) PCT Pub. No.: WO2006/123188
PCT Pub. Date: Nov. 23, 2006

(65) Prior Publication Data
US 2008/0206534 A1    Aug. 28, 2008

(30) Foreign Application Priority Data

May 20, 2005  (EP) .................................. 05270017.6
May 20, 2005  (GB) ..................................... 0510317

(51) Int. Cl.
*H01Q 15/14* (2006.01)
*H01Q 15/08* (2006.01)
*G02B 5/20* (2006.01)
*G02B 1/04* (2006.01)
*B32B 7/02* (2006.01)

(52) U.S. Cl.
USPC ........ 343/909; 343/911 R; 428/220; 428/702; 428/704; 359/359

(58) Field of Classification Search
USPC ......... 359/350, 359, 577, 580, 582, 584–586, 359/588–589, 601–602, 838–839, 359/884–885; 343/907–912
See application file for complete search history.

(56) References Cited

U.S. PATENT DOCUMENTS

| | | | |
|---|---|---|---|
| 3,396,400 A | | 8/1968 | Kelly et al. |
| 3,671,286 A | * | 6/1972 | Fischell .................. 428/332 |
| 4,479,131 A | * | 10/1984 | Rogers et al. .............. 343/872 |
| 4,850,660 A | | 7/1989 | Jones et al. |
| 5,215,824 A | | 6/1993 | Munro, III et al. |

(Continued)

FOREIGN PATENT DOCUMENTS

| | | |
|---|---|---|
| EP | 0 529 776 A1 | 3/1993 |
| EP | 1 208 394 A2 | 5/2002 |

(Continued)

OTHER PUBLICATIONS

"Infrared radiation." Encyclopædia Britannica. 2008. Encyclopædia Britannica Online. Oct. 27, 2008 http://www.britannica.com/EBchecked/topic/287964/infrared-radiation.*

(Continued)

*Primary Examiner* — Prashant J Khatri
(74) *Attorney, Agent, or Firm* — Buchanan Ingersoll & Rooney PC

(57) ABSTRACT

A thermal control film for use in spacecraft having a multi-layer interference filter adapted to exhibit high reflectivity to solar radiation, low absorptivity across the microwave spectrum and high emissivity in the far infra-red. The film is free from metal and extends over the active face of an antenna carried by the spacecraft. Such a film exhibits the desired thermo-optical properties for a thermal control radiator surface and can be used over the active face of a communications or radar antenna without disrupting the RF signal.

15 Claims, 4 Drawing Sheets

(56) References Cited

U.S. PATENT DOCUMENTS

| | | | | |
|---|---|---|---|---|
| 5,327,149 | A | * | 7/1994 | Kuffer .................... 343/720 |
| 5,373,305 | A | * | 12/1994 | Lepore et al. ............... 343/872 |
| 5,882,774 | A | * | 3/1999 | Jonza et al. ................ 428/212 |
| 6,391,400 | B1 | * | 5/2002 | Russell et al. ............... 428/34 |
| 6,587,263 | B1 | * | 7/2003 | Iacovangelo et al. ......... 359/359 |

FOREIGN PATENT DOCUMENTS

| | | |
|---|---|---|
| FR | 2 252 039 | 6/1975 |
| GB | 2 277 200 A | 10/1994 |
| JP | 3-006105 | 1/1991 |
| WO | 01/75486 A2 | 10/2011 |

OTHER PUBLICATIONS

Chapter 3.6. "Antennas." Gilmore, David G. Spacecraft Thermal Control Handbook, vol. 1—Fundamental Technologies (2nd Edition). American Institute of Aeronautics and Astronautics. 2002.*

Harrison, John. "Investigation of Reflective Materials for the Solar Cooker." Florida Solar Energy Center, published Dec. 24, 2001.*

Pauly, H. "Cryolite, chiolite and cryolithionite: optical data redetermined". Bull. geol. Soc. Denmark, vol. 26, pp. 95-101; (1977).*

Billings et al. "The Infra-Red Refractive Index and Dispersion of Evaporated Stibnite Films". Journal of the Optical Society of America, vol. 37, No. 2, pp. 119-121; (1947).*

United Kingdom Search Report dated Aug. 16, 2005.

European Search Report dated Sep. 29, 2005.

3M Radiant Mirror Film VM2000F1A6 (Experimental), 3M Radiant Light Film, 3M Light Management Ventures, St. Paul, MN, 3 pages.

International Search Report and attached Written Opinion, issued in corresponding International Application No. PCT/GB2006/050114 on Sep. 6, 2006 by the European Patent Office, Rijswijk, The Netherlands.

* cited by examiner

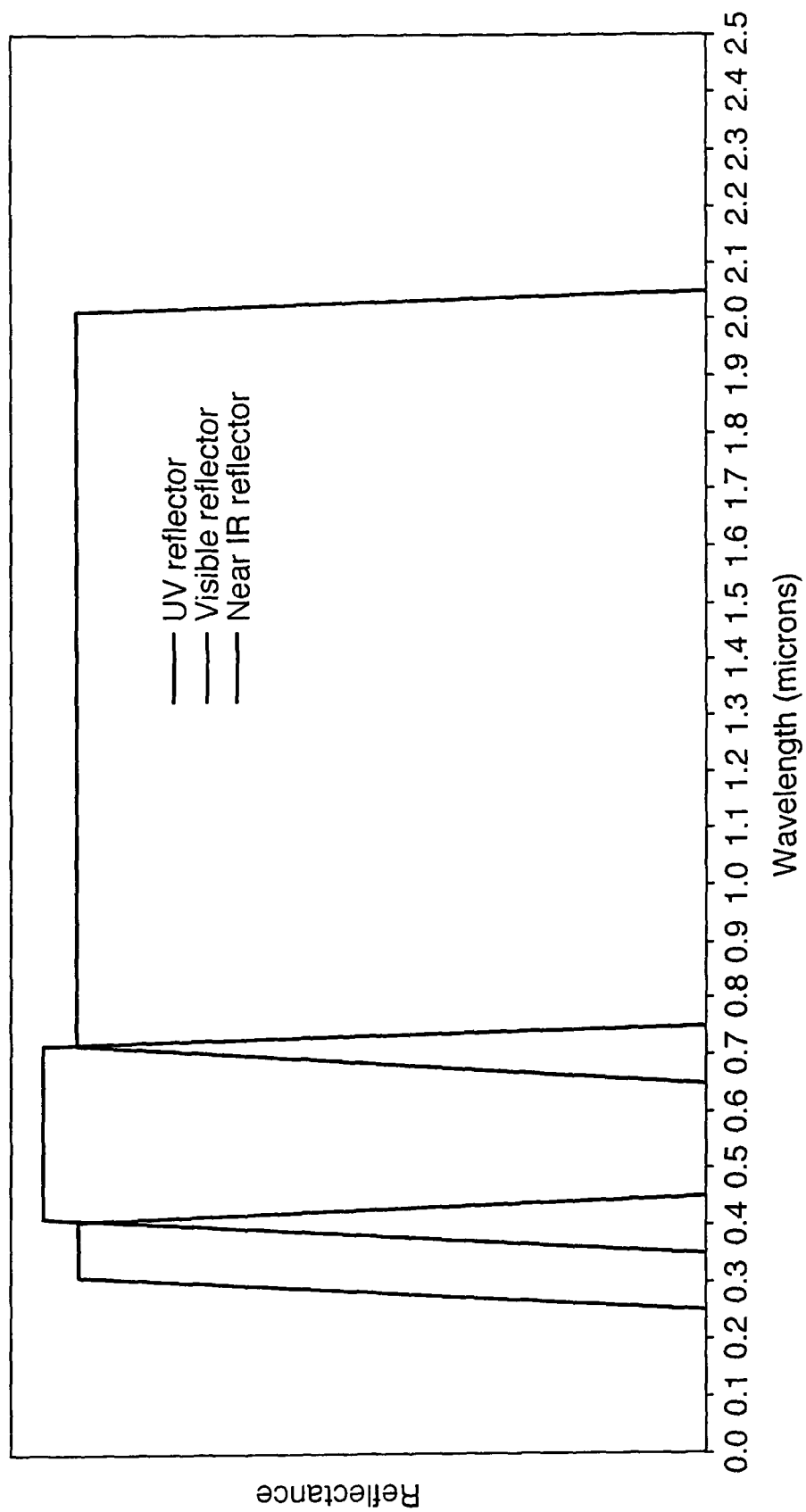

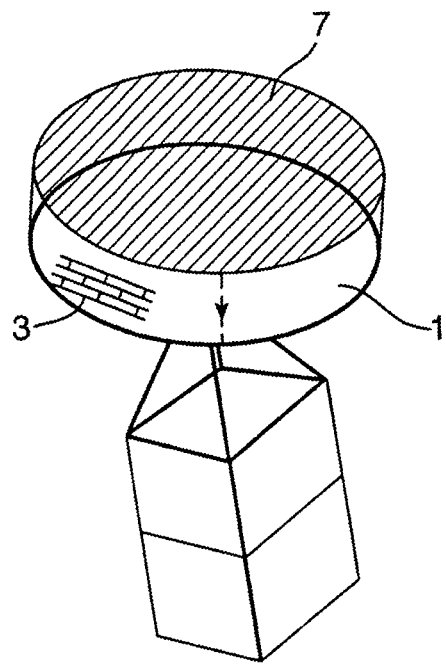

THERMAL CONTROL FILM FOR SPACECRAFT

Spacecraft communications payloads generate large amounts of heat that must be dissipated into space by thermal radiation through its external surfaces. In addition, the radiating surfaces are subjected to thermal radiation from incident sunlight, which degrades the thermal efficiency thereof. The effects of this parasitic heat input may be reduced to some extent by selective orientation of the radiating surfaces or through the use of surface materials with appropriate thermo-optical properties. In the latter case, the general approach is to coat radiating surfaces that are subjected to relatively high levels of solar illumination, such as north-south facing surfaces of equatorial orbiting spacecraft, with a material having a low absorption factor to sunlight and a high emissivity in the infrared range.

One such type of material is a white paint containing a pigment that reflects sunlight. Such coatings are inexpensive but exhibit relatively poor performance, particularly on long duration missions, due to ultra-violet degradation of the surface. Alternatively, an optical solar reflector (OSR) material may be used. The OSR (also called a second surface mirror) comprises an optically transparent dielectric material, such as glass, that emits well, backed with a metallic reflective layer, such as silver. These materials are relatively stable and retain their optical properties over time.

Both these types of material operate on the basis that incoming solar radiation is at a different wavelength than that of the thermal radiation emitted by the radiating surface, as illustrated in FIG. 1. Hence, materials with appropriate characteristics in each of these respective wavebands can be selected to transmit or reflect radiation. However, even with the metallic reflective layer it has been found that reflection of sunlight is far from optimum at ultra violet wavelengths where a significant portion of solar energy is concentrated.

U.S. Pat. No. 6,587,263, describes an improved OSR having a composite structure comprising a substrate, a bonding layer coated thereon, a reflective layer coating the bonding layer and a radiative layer coating the reflective layer. The reflective layer is typically made of silver or aluminium and is approximately 50-100 nm in thickness. The radiative layer is deposited directly on the reflective layer and includes one or more layers of modulated $SiO_2/SiO_xN_y/Si_3N_4$ coatings that exhibit a spatially varying refractive index.

The materials used in the radiative layer are selected to have low absorbency of electromagnetic radiation in the solar spectrum (200 nm to 2500 nm). This includes part of the UV spectrum (200-400 nm), the visible spectrum (4000-750 nm) and the near infrared spectrum (750-2500 nm). The material must also exhibit high absorbency and emissivity in the infrared wavelength range (2.5 μm to 25 μm), that corresponds to excess heat generated by the generated by electronic devices within the OSR itself. In addition, because of the problems associated with reflection by the metallic (Ag or Al) reflective layer in the UV spectrum, the modulated radiative layer is designed so as to reflect light in a wavelength range that is associated with interface absorption, typically 380 nm so that the corresponding incident solar radiation does not reach the interface with the reflective metallic layer.

The above structure acts both as a radiator and a reflector depending on frequency, the broad-band reflective properties (UV, visible and near infra-red) being achieved primarily by the metal layer and the radiative layer achieving improved reflection of nuisance UV radiation and improved emissivity of infrared. However, although such an OSR exhibits improved thermal performance and permits much thinner glass to be used, reliance on a metal layer to achieve reflection of visible light is still required.

A particular problem arises with spacecraft which carry active transmit antenna arrays. Such antenna arrays may comprise several hundred individual radiating elements, each element having an associated T/R module which provides phase control of the radio frequency (RF) signals applied to, or received from, the associated antenna element so that the net radiation pattern of the array has the desired directional properties. The T/R modules also amplify the received signal with a low-noise amplifier, amplify the signals to be transmitted with a power amplifier, and provide various other functions such as adjustable attenuation and transmit/receive switching. Hence each individual T/R module of the array involves numerous high frequency circuits that must be mounted in the region of the associated antenna element. These antenna arrays consume large amounts of input power (10 KW or more) and the waste heat to be radiated may exceed 5 kW.

Because these antennas typically have a diameter of the order of 3 meters, in normal circumstances, the surface area is sufficient to allow dissipation of the excess thermal energy and the maintenance of normal operating temperatures. However, for a direct radiating antenna oriented towards the Earth, the solar input may be of the order of about 1 kW per square meter for several hours per day. For such antennas, dissipation of such solar input is not possible using conventional OSRs because the reflective metal layer, typically silver or aluminium, is opaque at microwave frequencies.

It is an object of the invention to provide a film material that provides thermal control in spacecraft applications and meets microwave transmission requirements. It is further object of the present invention to provide a thermal film material for space craft applications that does not require a metal layer to achieve reflection.

From a first aspect, the present invention resides in a thermal control film for use in spacecraft comprising a multi-layer interference filter adapted to exhibit preselected high absorbency and emissive characteristics in the far infrared wavelength range 2.5 μm to 50 μm, low absorbency characteristics in the solar spectrum range 200-2500 nm and high transmissive characteristics in the microwave frequency spectrum 1 to 30 GHz.

The combination of high reflectivity to solar radiation, low absorptivity across the microwave spectrum and a high emissivity in the far infra-red exhibited by the film constructed according to the present invention provides the desired thermo-optical properties for a thermal control radiator surface that can be used on surfaces such as the active face of a communications or radar antenna, without causing disruption of RF signals.

The thermal control film is preferably metal free and hence exhibits high transparency to the microwave frequencies used by communications and radar. In addition, the absence of metal is advantageous in that the film will not be susceptible to corrosion or electromagnetic interference that may affect operation of spacecraft equipment.

The film preferably covers the active face of an antenna carried by the spacecraft.

In this way, the active face of the antenna may be used as a thermal control radiator to dissipate heat waste produced by the amplifiers and other active components of its associated T/R modules into space rather than having to be transported to a remote radiator.

The film may be in the form of a flexible sheet or in the form of a liquid coating to be applied to a surface of the spacecraft.

The multi-layer interference filter comprising the film is preferably a polymeric structure. Use of such a polymeric structure is advantageous in that all the layers can be extruded simultaneously with or without a substrate and the final optical properties can be precisely controlled. In addition, such thermal films can be easily shaped to the form of the surface to which they are to be attached.

Alternatively, the multi-layer interference filter may comprises one or more layers of any of combination of $SiO_2$, $SiO_xN_y$, and $Si_3N_4$ and may be in form of a plurality of individual tiles. Such tiles are known to be resistant to ionising radiation damage and can be bonded directly to irregular exposed surfaces of equipment with a high thermal dissipation.

Such tiles preferably have a thickness of less than 200 microns and more preferably in the range of 50 to 150 microns.

From a further aspect, the present invention resides in an antenna comprising such a thermal control film extending over the active face thereof.

For a better understanding of the present invention, reference will now be made, by way of example only, to the accompanying drawings in which:—

FIG. 3 illustrates the solar radiation spectrum that a typical thermal film carried by a spacecraft is exposed to;

FIG. 4 illustrates the desired reflectance spectrum of a thermal film constructed in accordance with an embodiment of the present invention;

FIG. 5 is a simplified representation of a spacecraft-mounted active transmit antenna incorporating a thermal control film according to the present invention fitted to its active surface.

Recent technological achievements have led to the relatively inexpensive construction of thin-film interference filters featuring major improvements in wavelength selection and transmission performance. The basic concepts employed in thin film interference filters are:

(i) the amplitude of reflected light at the boundary between two media is given by $(1-r)/(1+r)$ where r is the ratio of the refractive indices at the boundary;

(ii) there is a phase shift of 180 degrees when reflectance takes place in a medium of lower refractive index than the adjoining medium, and zero phase shift if the medium has higher refractive index than the adjoining one; and (iii) if light is split into two components by reflection at the upper and lower surfaces of a thin film, then the beams recombine in such a way that the resultant amplitude will be the difference of amplitudes of the two components, if the relative phase shift is 180 degrees (destructive interference), or the sum of the amplitudes, if the relative phase shift is either zero or a multiple of 360 degrees (constructive interference).

Figure 1:
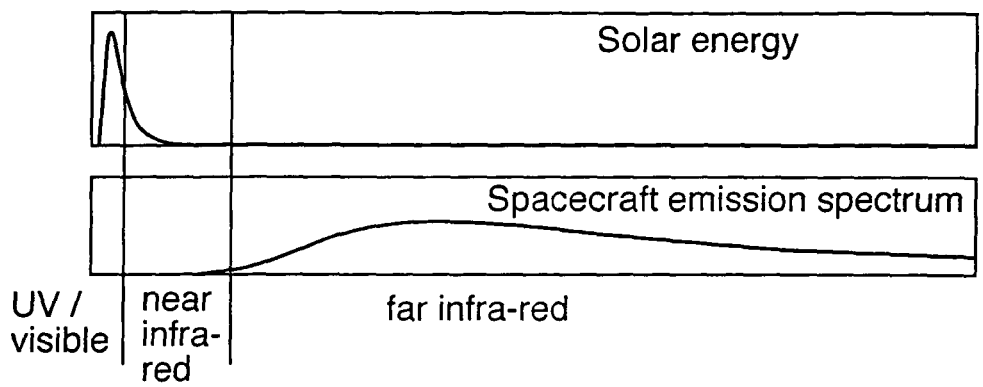
FIG. 1 is a simplified diagram illustrating the spectrum of incoming solar radiation to the surface of a spacecraft.
Figure 2:
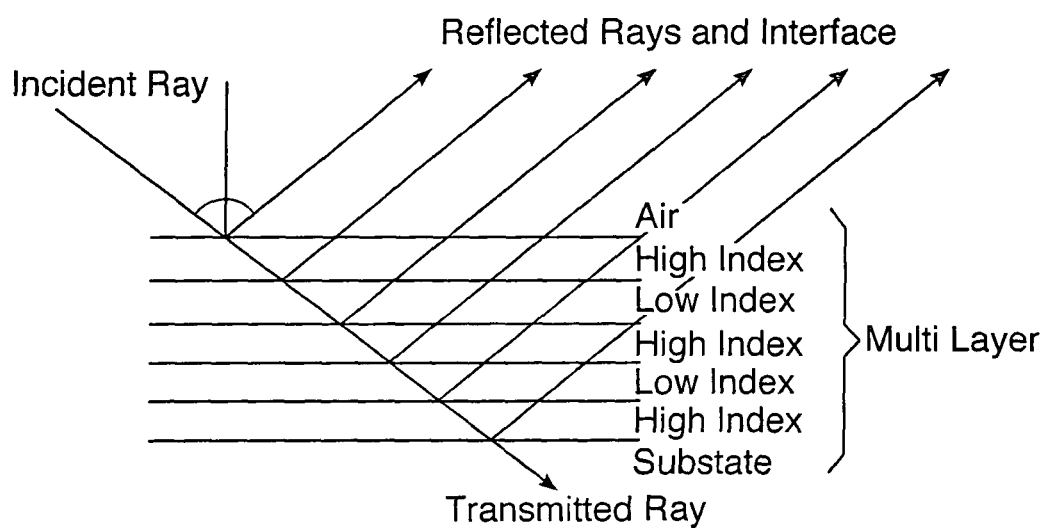
FIG. 2 is a schematic diagram of a basic thin film structure used in optical interference filters.

FIG. 2 illustrates the basic type of thin film structure used in interference filters and consists of a stack of alternating high and low index dielectric films, all of one quarter wavelength in thickness. Light reflected within the high index layers will not suffer any phase shift due to reflection, whereas light reflected within the low index layers will undergo a 180 degree phase shift as a result of reflection. Since all of the layers are one quarter wavelength thickness (90 degree phase thickness), it can be seen that the different components of the incident light produced by reflection at the incident boundaries are all in phase at the front surface of the film. These beams combine constructively and the intensity of the beam is very high in comparison to the incident beam. The effective reflectance of the film can be made very high for a particular wavelength by increasing the number of alternating layers in the stack. The range of wavelengths for which the reflectance remains high depends on the ratio of refractive indices of the two materials in the stack. Outside this range of wavelengths, the reflectance of the film falls abruptly to a very low value.

The angle of incidence of incoming radiation is also important in the design of an interference filter as it affects the optical depth of the layers. In other words, the central wavelength of the filter will decrease with an increase in the incident angle and the amount of wavelength shift is dependent upon the incident angle and the effective refractive index of the filter.

Various different types of optical filter coatings or films can be implemented using thin film technology. Antireflection coatings that reduce surface reflections and increase transmittance can be realised as a single layer having zero reflectance at one wavelength to a multi-layer structure having zero reflectance over a range of wavelengths. Edge filters (e.g. long and short wave pass filters) exhibit an abrupt change between a region of rejection and a region of absorption. Band-pass filters exhibit a region of transmission with regions of rejection on either side while minus filters eliminate one wavelength band from a spectrum, i.e., have a narrow region of rejection bound on either side by regions of transmission.

The design of multi-layer filters is complex involving calculations of the reflectance and transmission that is taking place at each layer interface of the stack. Computer aided design tools have greatly facilitated the design and optimisation of thin film optical coatings. In particular, a technique known as needle optimisation allows for the design and refinement of interference filters to precise specifications for particular applications. The essence of this optimisation technique is that a thin film filter functions on the basis of interference effects that are determined by the phase and amplitude of reflected light waves. The numerical measure of the correspondence between the actual and desired spectral characteristics of the design is provided by the merit function of the coating. The smaller the value of the merit function, the closer the correspondence between the target and actual values. When the merit function is optimised with respect to layer thickness, the phase relationship between the reflected waves is changed. If optimisation with respect to refractive indices of the layers is performed, the amplitude of the reflected waves is also being changed. The mathematical optimisation process is finished when it becomes impossible to minimise the merit function further without introducing new layers into the multi-layer structure.

The insertion of such new layers at appropriate positions within the stack is equivalent to changing the refractive index profile of the stack and the interference effects associated with these new layers will improve the correspondence between the target and actual values. The algorithm used in the needle optimisation technique identifies the locations, if any, that new layers should be inserted into the multi-layer structure that will improve the merit function and which material, from a pre-selected group of materials that will provide the greatest improvement.

Optical coatings are normally manufactured in high vacuum coating chambers using conventional processes such as thermal evaporation. Recently, more advanced techniques known as energetic PVD processes, such as ion assisted deposition (IAD), ion beam sputtering and reactive magnetron sputtering have been used to produce improved optical coatings which can be applied to plastic substrates. Energetic PVD methods can, in many instances, result in fabrication of thin films with improved properties, including higher density, higher refractive index, decreased spectral performance sensitivity to temperature and moisture, and superior mechanical characteristics (such as durability). These techniques are also advantageous in that deposition can be carried out at near room temperatures as opposed to the elevated substrate temperatures (typically 300C) required for thermal evaporation processes.

A wide variety of substrate materials can be utilised for fabrication of thin-film interference filters, and are chosen to meet the optical and mechanical requirements of their intended application as well as for compatibility of their physical properties with the required coating materials. Among the properties that are significant for optical substrate materials in various applications are transmittance in the wavelength range of interest, thermal expansion coefficients and density. The materials should also be resistant to chemical etching, and to mechanical and thermal shock. Some of the more common optical substrate materials are magnesium fluoride, calcium fluoride, Suprasil 1 (trade name for a variety of fused silica), ultraviolet-grade fused silica, Infrasil 301 (trade name for fused natural quartz product having low hydroxyl content), crystal quartz and sapphire. For OSRs, a borosilicate optical glass such as BK7, is typically chosen due to its excellent optical properties, stability in a space environment and its cost.

Multi-layer optical thin film interference filters can now be manufactured with all-polymer components. Typically, polymeric thin film filters are made by co-extruding all layers simultaneously with or without a substrate and can be formed as free-standing film stacks having anywhere from 10 to 1000 layers with controlled thickness distribution. For added toughness, outer skin layers may be included in the co-extruded film stacks and may consist of one of the polymers in the optical layers in the film stack or can be a different material. The choice of polymers used is based on a number of criteria, including refractive index and melt characteristics. The final optical properties of the mirror (i.e., variations in refractive index from one later to the next) can be precisely controlled by alternate stretching and cooling of the multi-layer polymer material) which is equivalent to the insertion of new layers in the needle optimisation technique described above Such thermal films can be shaped to the form of the surface to which it is to be joined by thermoforming, which uses a combination of heat and pressure to conform the film to the shape of a pre-made mould. The mould is first shaped to that of the surface to which the film is to be laminated. Once thermoformed, common optical adhesives or other fixing methods can then be employed to join the film to the surface. Cold shaping of polymer multi-layer film is also possible in applications where fabrication of a pre-made mould is not feasible.

Figure 3:
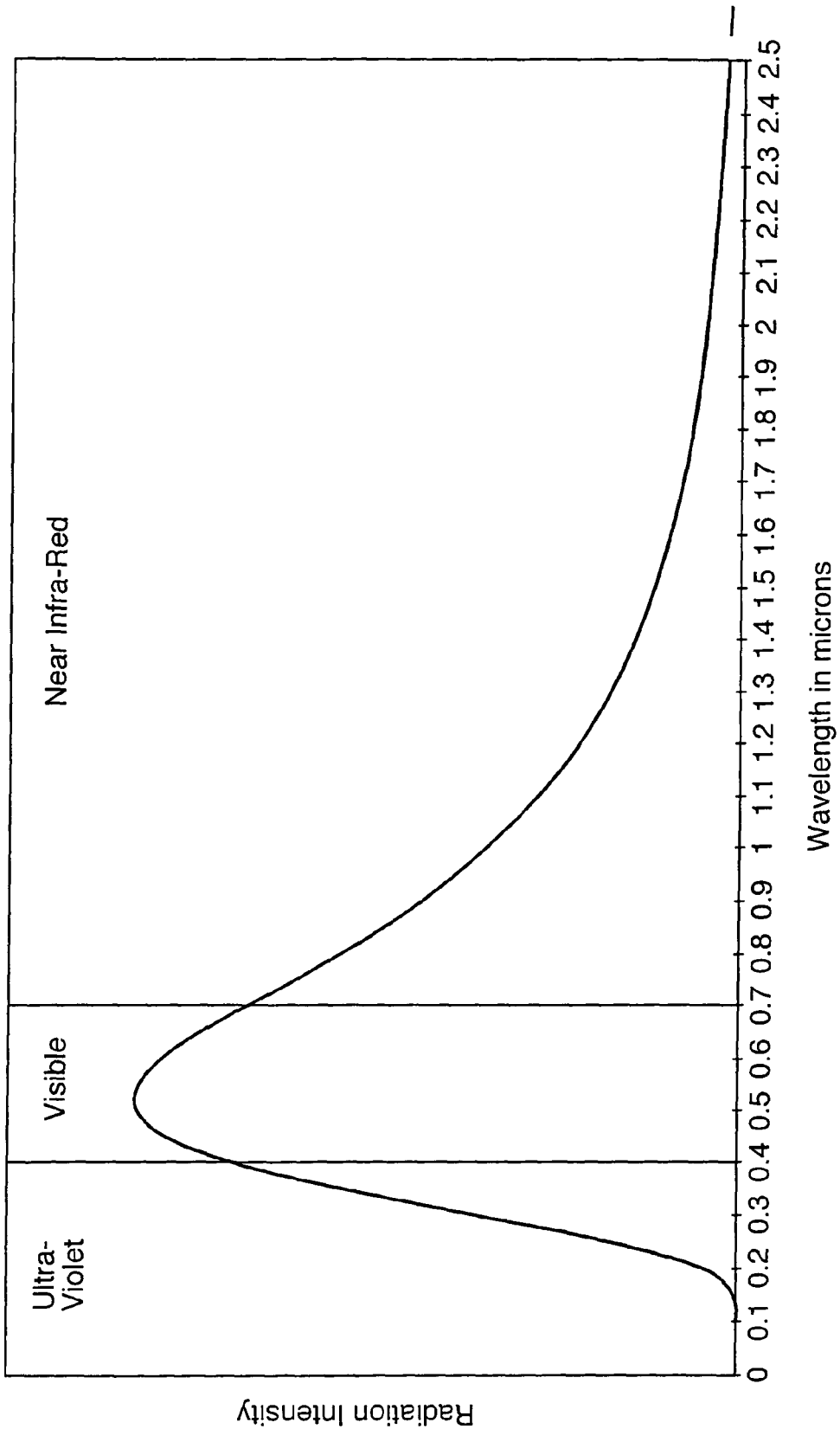

The thermal control film according to a preferred embodiment of the present invention comprises a polymeric multi-layer structure comprising a set of interference filters designed and optimised to exhibit the desired optical characteristics as is illustrated in FIGS. 3 and 4. The film is required to have low absorbency of solar radiation, which includes part of the UV spectrum (200-400 nm), the visible spectrum (4000-750 nm) and the near infrared spectrum (750-2500 nm). The film must also exhibit high absorbency and emissivity in the far infrared wavelength range (2.5 µm to 50 µm), that corresponds to the spectrum of heat generated by the high frequency circuits associated with the T/R modules of the antenna array. A further essential criteria is that the film exhibit a high transparency to the microwave frequencies, typically 1 to 30 GHz, used by communications and radar observation. Since the film is to be designed for use in space, the materials used should not only be capable of withstanding the temperature variations involved but also be able to maintain the optical characteristics required in such an extreme environment. Also since the bandwidths of the rejection bands are very high, the ratio of refractive indices between the materials used in the film should be as high as possible.

The thermal film used in the preferred embodiment comprises a multi-layer polymeric film such as the Radiant Mirror Film products from 3M™. The 3M Radiant Mirror Film VM2002 is an experimental or developmental material which is made available for evaluation, testing or experimental purposes and comprises a multi-layer polymeric film with an outer protective layer of polyethylenenaphthalate to prevent degradation of the final optical properties through abrasion, moisture ingress or other environmental factors. The film is metal free and so will exhibit a high transparency to the microwave frequencies used by communications and radar equipment. In addition, the absence of metal is advantageous in that the film will not be susceptible to corrosion or electromagnetic interference that may affect operation of the antenna. The film material is thermally stable with a maximum continuous use temperature up to 125 C, and typically exhibits high reflectance over a (400-415) nm to (775-1020 nm) bandwidth with an angle of incidence range of 0 to 80. The film transmits wavelengths in the near infrared spectrum above 775-1020 nm and exhibits low absorbency above 400 nm (i.e., the visible and infrared spectrum). An additional coating can be applied to the film so as to achieve the desired lower absorbency in UV spectrum if desired.

Although in the above embodiment, the film is based upon a commercially available material which is then adapted so as to achieve the desired optical characteristics, it should be understood that a customised material can be manufactured to the precise specifications required. Such customised films can be obtained from specialist suppliers such as 3M™ and numerous others. As described earlier, the angle of incidence of radiation is an important factor in such a multi-layer film. For north-south radiating surfaces of an equatorial orbiting spacecraft, maximum solar input occurs at the solstices when the radiating surfaces are tilted at 23 degrees to the sun, since this is the angle of tilt of the Earth. Such a customised film would ideally be optimised for this angle.

FIG. 5 illustrates an active transmit antenna array of a spacecraft incorporating a thermal film according to a preferred embodiment of the present invention in simplified form. It should be understood that the invention could be applied to any type of microwave antenna. As described previously, the antenna array 1 comprises several hundred individual radiating elements 3 (a small number of which are shown in the drawing), each element 3 having associated RF electronic circuits mounted in the region of the associated antenna element 3. These antenna arrays consume large amounts of input power (10 KW or more) and the waste heat to be radiated may exceed 5 kW.

The thermal film 7, according to a preferred embodiment of the invention is manufactured in the form of a free-standing flexible sheet that has been cut to the shape and the dimensions of the antenna 1 to which it is to be applied. For ease of illustration, in FIG. 5, the film 7 is shown prior to attachment to the active surface of the antenna 1. The sheet, which has a thickness in the range of 50 to 150 microns, is then placed over the active surface of the antenna 1 and attached thereto using an appropriate optical adhesive. In this way, the active face of the antenna 1 may be used as a thermal control radiator to dissipate heat waste produced by the amplifiers and other active components of its associated T/R modules into space, rather than having to be transported to a remote radiator. The flexible nature of the polymer based film construction facilitates attachment to the curved surfaces of the antenna. The thickness of the film should not exceed 200 microns.

The combination of high reflectivity to solar radiation, low absorptivity across the microwave spectrum and a high emissivity in the far infra-red exhibited by the film constructed according to the present invention provides the desired thermo-optical properties for a thermal control radiator surface that can be used over the active face of a communications or radar antenna without disrupting the RF signal.

It should be understood that while an adhesive can be used to join the film to the antenna surface, other methods of attachment may also be used such as clips, buttons or other suitable fastening means. Such means of attachment may be more appropriate when the antenna has an irregular shape or when the surface thereof is not smooth. The sheet can also be formed to the shape of the antenna by thermoforming.

Although a polymeric based thermal film according to the invention has been described, it should be understood that a construction based on glass or quartz may also be used. As described earlier, a borosilicate optical glass such as BK7, is a particularly suitable substrate material due to its excellent optical properties, stability in a space environment and its cost. The interference layers may comprise one or more layers of any of combination of $SiO_2$, $SiO_xN_y$, and $Si_3N_4$ or any other appropriate materials. The interference filter based on such material is designed and optimised to exhibit the desired optical characteristics as described above. Such a film can be manufactured in the form of a free-standing sheet of film as described above, a series of tiles, or as a coating to be applied to the surface.

The invention claimed is:

1. An antenna comprising:
    an active face, at least one radiating element for transmitting radio frequency (RF) signals via the active face, and
    a metal free thermal control film covering the active face, the metal free thermal control film comprising:
    a multi-layer interference filter having alternating higher and lower refractive index layers arranged to filter optical radiation based on interference effects between different components of the optical radiation produced by reflection at boundaries between the layers, said control film exhibiting preselected high absorbency and emissive characteristics in an infrared wavelength range between 2.5 μm to 50 μm and low absorbency characteristics in a solar spectrum range between 200 nm to 2500 nm to limit solar input and allow heat dissipated in the antenna to be radiated into space via the active face, the control film further exhibiting high transmissive characteristics in a microwave frequency spectrum 1 to 30 GHz to allow the RF signals to be transmitted via the active face.

2. The antenna according to claim 1, wherein the film is in the form of a flexible sheet.

3. The antenna according to claim 2 wherein the multi-layer interference filter is a polymeric structure.

4. The antenna according to claim 3, wherein the multi-layer interference filter comprises one or more layers of any of combination of $SiO_2$, $SiO_xN_y$, and $Si_3N_4$.

5. The antenna according to claim 4, wherein the film is in the form of a plurality of tiles.

6. The antenna according to claim 5, wherein the thickness of the film is less than 200 microns.

7. The antenna according to claim 6, wherein the thickness of the film is in a range of 50 to 150 microns.

8. The antenna according to claim 1 wherein the multi-layer interference filter is a polymeric structure.

9. The antenna according to claim 1, wherein the multi-layer interference filter comprises one or more layers of any of combination of $SiO_2$, $SiO_xN_y$, and $Si_3N_4$.

10. The antenna according to claim 9, wherein the film is in the form of a plurality of tiles.

11. The antenna according to claim 1, wherein a thickness of the film is less than 200 microns.

12. The antenna according to claim 1, wherein a thickness of the film is in the range of 50 to 150 microns.

13. The antenna according to claim 1 wherein the film is formed by applying a liquid coating to a surface of a spacecraft.

14. A spacecraft antenna comprising
    an active face comprising at least one radiating element for transmitting radio frequency (RF) signals, and
    a metal free thermal control film covering the active face, the metal free thermal control film comprising a multi-layer interference filter having alternating higher and lower refractive index layers arranged to filter optical radiation based on interference effects between different components of the optical radiation produced by reflection at boundaries between the layers, said control film exhibiting sufficiently high absorbency and emissive characteristics in an infrared wavelength range 2.5 μm to 50 μm and sufficiently low absorbency characteristics in a solar spectrum range 200 nm to 2500 nm to limit solar input and allow heat dissipated in the antenna to be radiated into space via the active face, the control film further exhibiting sufficiently high transmissive characteristics in a microwave frequency spectrum 1 to 30 GHz to allow through RF signals transmitted by said at least one radiating element.

15. A spacecraft antenna comprising
    an active face comprising at least one radiating element for transmitting radio frequency (RF) signals, and
    a metal free thermal control film covering the active face, the metal free thermal control film comprising a multi-layer interference filter having alternating higher and lower refractive index layers arranged to filter optical radiation based on interference effects between different components of the optical radiation produced by reflection at boundaries between the layers, said control film being configured to absorb and emit radiation in an infrared wavelength range 2.5 μm to 50 μm to dissipate waste heat produced by active components of the antenna into space via the active face, said control film being configured to reflect solar radiation to limit solar input via the active face, and, the control film further being configured to transmit radiation in a microwave frequency spectrum 1 to 30 GHz to allow through RF signals transmitted by said at least one radiating element.

* * * * *